(12) United States Patent
Deisinger et al.

(10) Patent No.: US 11,248,661 B2
(45) Date of Patent: Feb. 15, 2022

(54) ROLLING BOOT COMPRISING AT LEAST ONE REINFORCEMENT FIN

(71) Applicant: GKN Driveline International GmbH, Lohmar (DE)

(72) Inventors: Markus Deisinger, Siegburg (DE); Daniela Ballas, Remscheid (DE); Winfried Busch, Hennef (DE); Olaf Wolf, Siegburg (DE); Bernd Bender, Cologne (DE)

(73) Assignee: GKN Driveline International GmbH, Lohmar (DE)

( * ) Notice: Subject to any disclaimer, the term of this patent is extended or adjusted under 35 U.S.C. 154(b) by 266 days.

(21) Appl. No.: 16/481,559

(22) PCT Filed: Feb. 22, 2017

(86) PCT No.: PCT/EP2017/054005
§ 371 (c)(1),
(2) Date: Jul. 29, 2019

(87) PCT Pub. No.: WO2018/153440
PCT Pub. Date: Aug. 30, 2018

(65) Prior Publication Data
US 2019/0368551 A1    Dec. 5, 2019

(51) Int. Cl.
*F16D 3/84* (2006.01)

(52) U.S. Cl.
CPC ............ *F16D 3/845* (2013.01); *Y10T 403/31* (2015.01)

(58) Field of Classification Search
CPC ............................... F16D 3/845; Y10T 403/31
USPC .......................................................... 464/173
See application file for complete search history.

(56) References Cited

U.S. PATENT DOCUMENTS

| | | | | |
|---|---|---|---|---|
| 2,062,748 | A * | 12/1936 | Golden | F16H 59/0213 74/18.1 |
| 4,826,466 | A | 5/1989 | Triquet | |
| 6,966,838 | B2 * | 11/2005 | Herchenbach | F16D 3/841 464/175 |
| 7,992,876 | B2 * | 8/2011 | Akturk | G05G 25/04 277/634 |
| 10,718,372 | B2 * | 7/2020 | Byrnes, Jr. | F16C 11/0671 |
| 2002/0132674 | A1 * | 9/2002 | Mohr | F16D 3/845 464/173 |
| 2007/0173337 | A1 | 7/2007 | Wormsbaecher et al. | |

FOREIGN PATENT DOCUMENTS

| | | | |
|---|---|---|---|
| DE | 102006027048 B3 | 11/2007 | |
| DE | 202013009239 U1 | 1/2014 | |
| SU | 819466 * | 4/1981 | ............ 403/50 |

(Continued)

OTHER PUBLICATIONS

International Search Report and Written Opinion for PCT/EP2017/054005 dated Jun. 7, 2017 (11 pages; with English translation).

*Primary Examiner* — Greg Binda
(74) *Attorney, Agent, or Firm* — Bejin Bieneman PLC

(57) ABSTRACT

A rolling boot that has improved stability especially at increased rotational speeds comprises a first fastening region, a second fastening region, a transition region adjacent to the first fastening region, as well as a diaphragm region adjoining the transition region, and at least on peripheral reinforcement fin is arranged on an external side of the transition region.

13 Claims, 4 Drawing Sheets

(56) References Cited

FOREIGN PATENT DOCUMENTS

| WO | 2009155955 | A1 | 12/2009 |
|----|------------|----|---------|
| WO | 2009155956 | A1 | 12/2009 |
| WO | 2013043187 | A1 | 3/2013  |
| WO | 2013170867 | A1 | 11/2013 |

* cited by examiner

ROLLING BOOT COMPRISING AT LEAST ONE REINFORCEMENT FIN

CROSS-REFERENCE TO RELATED APPLICATIONS

This application is a national stage of, and claims priority to, Patent Cooperation Treaty Application No. PCT/EP2017/054005, filed on Feb. 22, 2017, which application is hereby incorporated herein by reference in its entirety.

BACKGROUND

A variety of rotating boots of the type specified above are known from the prior art. As such, WO 2009/1555955 A1 discloses a rotating boot attached to a slip joint that is supposed to have improved properties when subjected to centrifugal forces, in particular with regard to the lubricant pressure then acting on the rotating boot. For this, a specific geometry is proposed between a transition region and a membrane region, and in particular the placement of external radial fins that bridge the transition region and are connected to a surface of a first membrane component of the membrane region. The boot disclosed therein is intended to reduce lubricant pressure, and does not need internal reinforcement fins due to its specific geometry, as was previously known from the prior art, as disclosed in WO 2009/155955 A1.

WO 2013/170867 A1 discloses a further development of the rotating boot according to WO 2009/155955 A1, with an improved stability. This is achieved by a specific configuration of the diameters of the transition region to those of the membrane region. There can also be outer radial fins in the transition region, similar to those disclosed in WO 2009/155955 A1.

The requirements for rotating boots in modern gearings or joint assemblies for utility and motor vehicles have increased, in particular with respect to the stability thereof at high rotational rates. In particular because of the increase in electric vehicles and the alternative drive systems used in automobiles, in particular with regard to the use of electric motors, higher rotational rates are obtained, such that rotating boots must withstand the further increased centrifugal forces resulting from higher rotational rates. These forces act on the lubrication in the boot, the so-called grease load, as well as on the boot material itself. There are various problems with the boots known from the prior art high rotational rates. In particular, the boot is stretched out in the transition regions, in particular as a result of the grease load, and the membrane region becomes deformed. The latter results in a reduced service life due to material wear. The stretching in the transition region in particular can also lead to undesired contact with adjacent components, as well as a reduced lubrication of adjacent joint components, in particular slip joints, including universal joints. In addition, the rotating boot normally bearing on the joint housing erodes in the region of a joint housing edge, in the proximity of the first fastening regions of the rotating boots, which face toward the joint housing.

SUMMARY

A rotating boot has at least a first fastening region, a second fastening region, a transition region adjacent to the first fastening region, and an adjoining membrane region. A universal joint, a shaft, and a joint assembly can have such a boot. Improvements to the rigidity of the boots known from the prior art result, such that they can satisfy the requirements placed thereon, in particular with regard to the service lives thereof, as well as for obtaining a sufficient lubrication of a joint, even at high rotational rates.

A rotating boot of the type specified in the above can have at least one, e.g., exactly one, circumferential reinforcement fin on an outer surface of the transition region. There can be exactly one reinforcement fin. The circumferential reinforcement fin can form a closed ring on the outer surface of the transition region. If there are two or more reinforcement fins, they can be parallel to one another on the outer surface of the transition region. The inventors have realized that with high rotational rates, a boot with a grease load is substantially subjected to tangential forces. These tangential forces cannot be deflected by the radial outer fins known from the prior art, and instead, at high rotational rates, they are simply displaced outward, without improving the radial rigidity of the rotating boot. An increase in the wall thickness of the rotating boot that would also improve the radial rigidity, would result in higher production costs, as well as a potentially reduced quality of the rotating boot. Increased costs can also be expected with the use of reinforcement fibers, in particular those oriented tangentially, in the rotating boot material. As an alternative, both in terms of the machining as well as the production costs, the inventors have arrived at the solution of placing at least one circumferential reinforcement fin on the outer surface of the transition region. The tangential forces are intercepted by this at least one reinforcement fin, even at high rotational rates, such that ultimately, the radial rigidity of the rotating boot is improved at high rotational rates.

In an example, the reinforcement fin on a wall portion of the transition region is substantially perpendicular to an inner surface of the wall portion. The reinforcement fin can also be referred to as being perpendicular to an upper surface of a binding seat region in the first fastening region. The at least one reinforcement fin itself has an upper surface and a lower surface, which are also preferably angled slightly toward one another. The angle can be in a range of approximately 0.5° to approximately 10°, or in a range of approximately 1° to approximately 7.5°.

In another example, the at least one reinforcement fin is displaced on the transition region toward a first subsection of the membrane region. The membrane region comprises the first sub-region, adjacent to the transition region, and an adjacent second membrane part, which can be referred to as trough-like. The first membrane part and the second membrane part are connected to one another by a rounded part, wherein the rounded part forms a type of circumferential peak in the manner of a bellows when the boot is viewed from above. The closer the at least one reinforcement fin, preferably exactly one reinforcement fin, is to the membrane region, and thus the first membrane part, i.e. the smaller the diameter of the at least one circumferential reinforcement fin is, the lower the centrifugal forces are that affect it, such that it is possible to reduce the tangential forces acting on it. In particular, a height $h_1$ between an upper surface of the first membrane part facing the first reinforcement fin, preferably exactly one reinforcement fin, adjacent thereto, and a lower surface of the reinforcement fin, is less than a height $h_2$ between a lower surface of an excess material of the first fastening region, if there is any, or a lower surface of the first fastening region, if there is no excess material, and an adjacent upper surface of at least one reinforcement fin facing it, preferably exactly one reinforcement fin. These heights $h_1$ and $h_2$ are determined directly on the outside of the transition region. The excess material has, in addition to its lower surface, an upper surface, which preferably contains a second positioning element of the first fastening region. The upper surface of the excess material can be substantially flush with an upper surface of the first binding seat region. The excess material also can have an end surface between the lower surface and upper surface. The end surface can transition smoothly, i.e. without steps, into an end surface of a radial fin, as shall be explained in greater detail below, and in particular, it can form a surface therewith that is flat and without irregularities. The ratio of the heights $h_1:h_2$ to one another can be in a range of approximately 0.2 to approximately 0.9, or in a range of 0.58 to approximately 0.88.

The transition region in the rotating boot comprises the wall portion and the at least one reinforcement fin located on the outside of the transition region. The transition region transitions directly into the membrane region, in that the first membrane part preferably adjoins the wall portion directly. The connection therebetween can be formed by the same material.

On the side facing away from the membrane, the transition region is bordered by the first fastening region, in particular by a lower surface of a binding seat region comprised in the first fastening region.

In another example of the present invention, an angle $\alpha$ is formed in a range of 0° to approximately 25°, preferably in a range of approximately 1.5° to approximately 22°, or in a range of approximately 2° to approximately 20°. As a result of this angle, the size in the region of the membrane part in particular can be reduced, such that with higher rotational rates, contact can be avoided with adjacent components when the membrane region stretches.

When the terms "approximately" or "substantially" are used in the present invention with respect to values, value ranges, or terms containing values such as "perpendicular," these are to be understood to mean that which a person skilled in the art in the given context would regard as normal from an expert perspective. In particular, deviations to the given values, value ranges or terms containing values, of ±10%, preferably ±5%, or ±2% are comprised in the terms "approximately" and "substantially."

In another example there are numerous supporting fins located between the at least one reinforcement fin and a first membrane part of the membrane region. There can be at least ten, or at least twenty, or at least thirty, and or at least forty supporting fins. These supporting fins engage with the lower surface of at least one reinforcement fin dedicated and adjacent to the first membrane part of the membrane region, and can extend beyond the lower surface of this reinforcement fin in another example, such that a ledge is formed. A smooth, i.e., continuous, transition between this reinforcement fin and the supporting fins is possible, however, seen in a cross section along a central axis of the rotating boot. End surface of the reinforcement fins and the supporting fins can transition into one another without steps, but a step can also be there formed. The supporting fins engage with the upper surface of the first membrane part facing the adjacent reinforcement fin, possibly over the entire surface thereof, extending radially outward. Possibly a transition of the reinforcement fins into the membrane region is smooth, i.e., continuous, seen in a cross section. The transition can be in the region of the first membrane part and/or the rounded part of the membrane region adjacent thereto. In another possible example, the height $h_1$ defined above, which also defines a height of the supporting fins, is as low as possible. The ratio of the heights to one another can be in the ranges defined above. As a result, the heights $h_1$ of the supporting fins are not very high, such that their weight is reduced, in particular with regard to the number of supporting fins located on the rotating boot, and they also exhibit a sufficient rigidity, such that they only exhibit a slight bending behavior between the first membrane part and the reinforcement fin adjacent thereto at high rotational rates. If there are two or more reinforcement fins, the supporting fins described above can also be formed between them.

In another example of the rotating boot, the supporting fins and the at least one reinforcement fin are substantially perpendicular to one another. This has a positive effect on the bending behavior of the supporting fins, i.e. their tendency to bend at higher rotational rates is further reduced.

In another example of the rotating boot, there are numerous radial fins located above the at least one reinforcement fin. In the present context, "above" refers to a region located above the reinforcement fin, delimited at one side by an upper surface of the at least one reinforcement fin. With numerous reinforcement fins, the term "above" refers to the region of an upper surface of that reinforcement fin that is closest to the first fastening region. In one example, the lower surface of the excess material of the first fastening region is adjacent to the upper surface of the reinforcement fin. The height $h_2$ of the region above this reinforcement fin is defined above. A transition between the at least one reinforcement fin and the numerous radial fins can be smooth, i.e. continuous, seen in a cross section, such that there are no steps here, in particular. A design with steps, i.e., an uneven design, is also possible. The transition of the radial fins to an excess material of the first fastening region can be smooth, i.e., continuous, as is the present case, such that there are no steps. The radial fins can be located beneath the excess material. They can be connected to a lower surface of the excess material. The radial fins also possibly do not extend beyond an end surface of the excess material. The radial fins also possibly form a common plane with their outer edges, or end surfaces, without steps, with the end surface of the excess material. Here as well, a design with a step, i.e., a non-continuous design, is also a possibility. With an uneven design such as this, the radial fins extend beyond an outer edge of the excess material and/or the at least one reinforcement fin. There can be at least ten, or at least twenty, and or at least thirty radial fins. There can be for example twice as many radial fins as supporting fins. The ratio of the number of radial fins to supporting fins lies in a range of approximately 0.2 to approximately 0.8, or in a range of approximately 0.3 to approximately 0.7, and or in a range of approximately 0.4 to approximately 0.6.

In another example, the supporting fins and the radial fins are substantially flush to one another. This means that they form, together with the at least one reinforcement fin, a common outer edge, or end surface. This common outer edge or end surface can be smooth, i.e. continuous, i.e., it has no steps. This common outer edge or end surface, formed by supporting fins, the at least one reinforcement fin, and radial fins, can also have steps. The common outer edge or end surface of the at least one reinforcement fin, the radial fins, and the supporting fins, can be curved, i.e. forms an arc segment. The common outer edge or the respective end surfaces of the various fins can also be uneven. The supporting fins and radial fins do not have to be flush with one another. In this case, they are then offset to one another on the outer surface of the transition region of the rotating boot. Their outer edges or end surfaces can either be continuous, or they can transition with a step into a corresponding end surface of the circumferential reinforcement fin.

A length of the at least one reinforcement fin, seen in a cross section, and determined starting from an outer surface of the wall portion, can vary in different regions. The maximum length is basically limited by a maximum length of the first membrane part, or a height of the membrane part, determined between the inner surface of the wall portion of the transition region and a tangent to the rounded part of the membrane section that is parallel thereto. The at least one reinforcement fin can have a length that is approximately 0.3× to approximately 0.9×, or 0.5× to approximately 0.8× the length of an upper surface of the first membrane part. A maximum width of the supporting fins, seen in a cross section, is delimited by a tangent to the rounded part of the membrane region that is parallel to the inner surface of the wall section of the transition region. A maximum width of the radial fins, seen in a cross section, can be delimited by the maximum length of the at least one reinforcement fin.

The first fastening region can have excess material. The excess material can comprise a sub-region of the first binding seat region, as well as an outer positioning element in the first fastening region, which represents a border for a binding element located in the binding seat region. Because the excess material is connected at its lower surface to radial fins, and is thus supported by the radial fins, a bending away of the rotating boot in the region of a joint housing edge is hampered, if not altogether prevented, such that the radial rigidity is further increased. The excess material relates to the region of the first fastening region that extends beyond the wall region with respect to the inner surface of the wall portion of the transition region, and thus with respect to a joint housing edge that bears on the inner surface of the wall region.

In an alternative example, the first fastening region has no excess material. A second positioning element in the proximity of the membrane region is then located in the first fastening region, displaced toward the at least one first positioning element, and together with the first positioning element defines the first binding seat region. Such a configuration is preferred if the at least one second positioning element is to be placed in the region of the excess material in the example described above. A binding element, by means of which the rotating boot can be attached to a joint housing via the first fastening region and the first binding seat region, can be placed between the at least one first and the at least one second positioning element. In another alternative example, the at least one second positioning element can be omitted, since its positioning function is assumed by numerous radial fins. Not all of the radial fins need to assume such a positioning function, but it is possible that all of the radial fins assume a corresponding positioning function. With this type of design, the positioning fins extend beyond an upper surface of the first binding seat region, and have a bearing or positioning surface, which faces the first binding seat region, and thus the at least one first positioning element, thus also defining a first positioning region. They can also bear on the binding element, but this is not necessary. The at least one first positioning element can be in the shape of an ear, in corresponding to the description above. The bearing, or positioning, surface provided by the radial fins can be substantially rectangular. In particular with such an example that has numerous radial fins, at least some of which form a bearing surface, which can also be referred to as a positioning surface for placing a binding element in the first binding seat region of the first fastening region, the height $h_2$ is determined starting from an lower surface of the first fastening region, and a surface of that reinforcement fin that is closest to the first fastening region.

The first binding seat region can have different designs. It can have a substantially flat upper surface. There can also be fin elements on the upper surface, in particular in the form of circumferential fins, preferably at least two, or at least three, four, five or more, in particular circumferential, fin elements that are adjacent to one another. The extend over the upper surface of the first binding seat region. In particular when closing a first binding element in the first binding seat region, these fin elements, or circumferential fins, improve the distribution of the closing force through the material of the first fastening region. The lower surface of the first fastening region of a rotating boot can also have different forms. They can be entirely flat, such that the lower surface and the upper surface are parallel to one another over the entire first binding seat region. There can be material accumulations on the lower surface of the first fastening region, however, preferably at least one, or at least two. These material accumulations can correspond to a circumferential groove located on a joint housing outer component that accommodates the at least one material accumulation on the lower surface of the first fastening region, possibly beneath the binding seat region.

A slip joint, possibly a universal slip joint, can have at least one boot as disclosed herein. Further, a shaft that has at least one boot as disclosed herein. The boot can be pre-assembled on the shaft, and or tensioned thereto. Further, a joint assembly can comprise at least one boot, at least one slip joint, and one shaft.

SUMMARY OF THE DRAWINGS

These and other advantages shall be explained in greater detail based on the following figures. Therein.

DESCRIPTION

It should first be noted that the examples shown in the figures are not limiting. Instead, the features described therein can be combined with one another and with the features described above to obtain further examples. There can thus also be fewer or more radial fins or fewer or more supporting fins, and in particular not just one, but numerous circumferential reinforcement fins. There can thus be, for example, two substantially parallel circumferential reinforcement fins, between which there can also be supporting fins, although this is not necessary. The first and second fastening regions can also have different designs, and do not need to have opposing positioning elements for defining a first or second binding seat region. Instead, there can also be other elements, such as circumferential fins, etc. The reinforcement fins and the supporting fins and/or radial fins also do not need to be flush to one another, such that they form a common outer edge or end surface. In particular, the geometric design of the membrane region can also be different. It should also be noted that the reference symbols in the descriptions of the figures do not limit the claims, but only refer to the examples shown in the figures.

A slip joint 6a,b, possibly a universal slip joint, can have at least one boot 10a,b as disclosed herein. Further, a shaft 8a,b that has at least one boot 10a,b as disclosed herein. The boot 10a,b can be pre-assembled on the shaft 8a,b, and or tensioned thereto. Further, an apparatus 4a,b such as a joint assembly can comprise at least one boot 10a,b, at least one slip joint 6a,b, and one shaft 8a,b.

In general, the rotating boot can be made of a number of different materials. These can be selected from a group comprising thermoplastic elastomers that have a basis of polyurethane (TPU), polyamide (TPA), polyolefin (TPO), polyester (TPEE), a thermoplastic elastomer vulcanizate (TPV), or a thermoplastic polyether ester elastomer (TEE). The boot material can also contain other additives, in particular additives for promoting diffusion, etc. Alternatively, an elastomer material can also be used for the boot material, although thermoplastic elastomer materials are preferred. A known thermoplastic elastomer material for the production of boots is known by the brand name "Hytrel" from DuPont. Mixtures of different thermoplastic elastomers, or elastomer materials can also be used. The rotating boot can be produced in an injection molding process.

Figure 1:
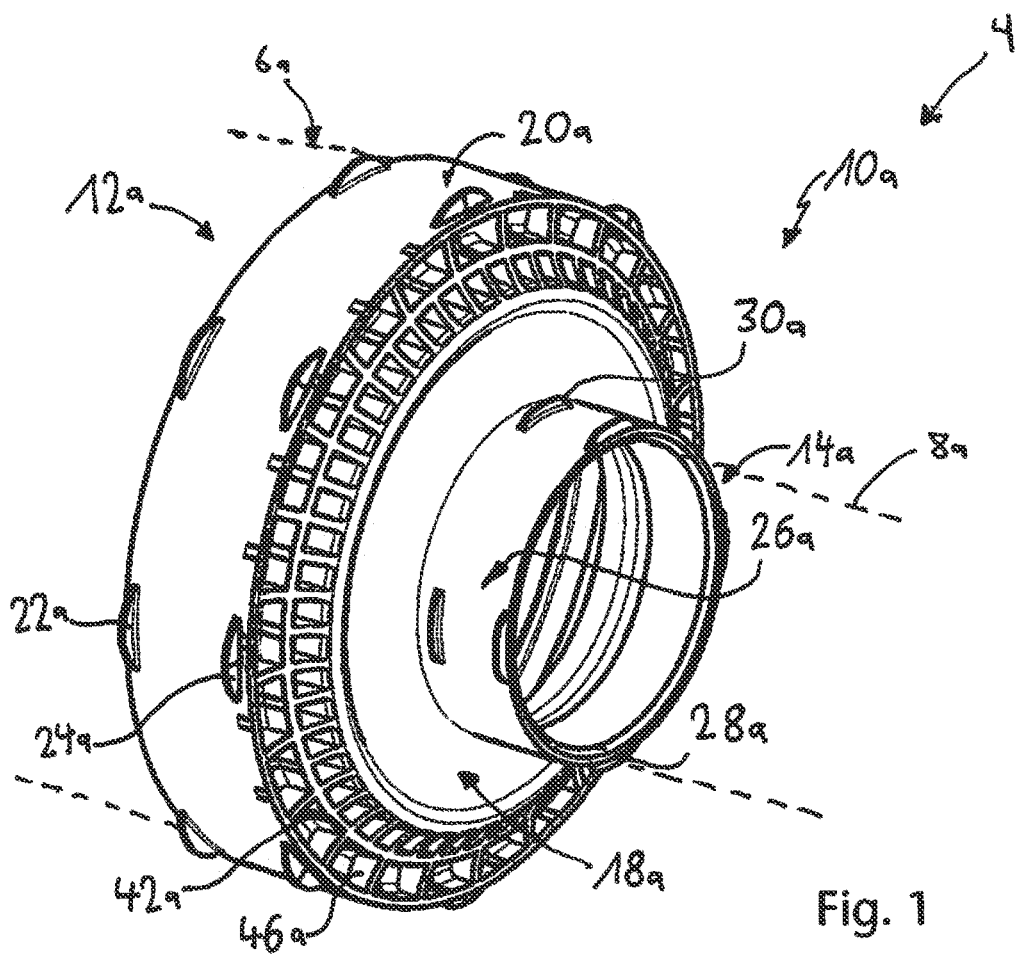
FIG. 1 shows a perspective view of a rotating boot, in a first example.

FIG. 1 shows a rotating boot 10a in a perspective view, in a first example, which has a first fastening region 12a with a first binding seat region 20a, which is defined by two opposing first and second positioning elements 22a, 24a. A binding element, not shown, can be placed in the binding seat region 20a, e.g., a compression ring, with which the rotating boot 10a can be placed on a joint housing, e.g. for the slip joint 6a.

The rotating boot 10a has a second fastening region 14a with a smaller diameter than the first fastening region 12a. This fastening region is otherwise similar to the first fastening region 12a, and has opposing, ear-shaped third and fourth positioning elements 28a, 30a, and a binding seat surface 26a defined therebetween. The rotating boot 10a can be mounted or preassembled on the shaft 8a, possibly under tension, via the second binding seat surface 26a, e.g. by means of a binding element, in particular a compression ring.

There is a transition region 16a directly adjacent to the first fastening region 12a, which in turn is adjacent to a membrane region 18a. The membrane region 18a transitions into the second fastening region 14a. There is exactly one reinforcement fin 42a in the transition region 16a, which is formed circumferentially on an outer surface 17a (see FIG. 4) of the transition region 16a. There are numerous supporting fins 44a between the membrane region 18a and this reinforcement fin 42a, wherein every second supporting fin 44a transitions into radial fins 46a, flush with a common outer edge, which is located above the reinforcement fin 42a, between the reinforcement fin and the first fastening region 12a.

Figure 2:
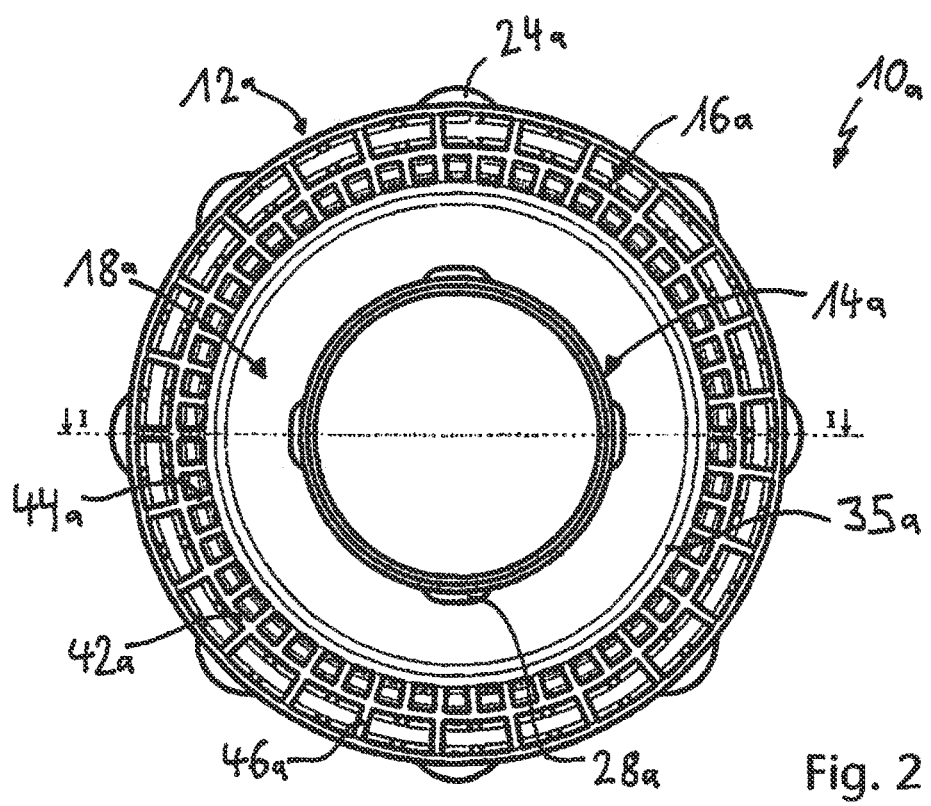
FIG. 2 shows a top view of the rotating boot shown in FIG. 1.

FIG. 2 shows the rotating boot 10a according to FIG. 1 in a top view, such that the rotational symmetry of the placement of the reinforcement fin 42a forming a circumferential, i.e. closed, ring, and the configuration of the supporting fins 44a and the radial fins 46a can be readily seen. It should also be noted that there are approximately twice as many supporting fins 44a than radial fins 46a. The supporting fins 44a and the reinforcement fin 42a are substantially perpendicular to one another.

Figure 3:
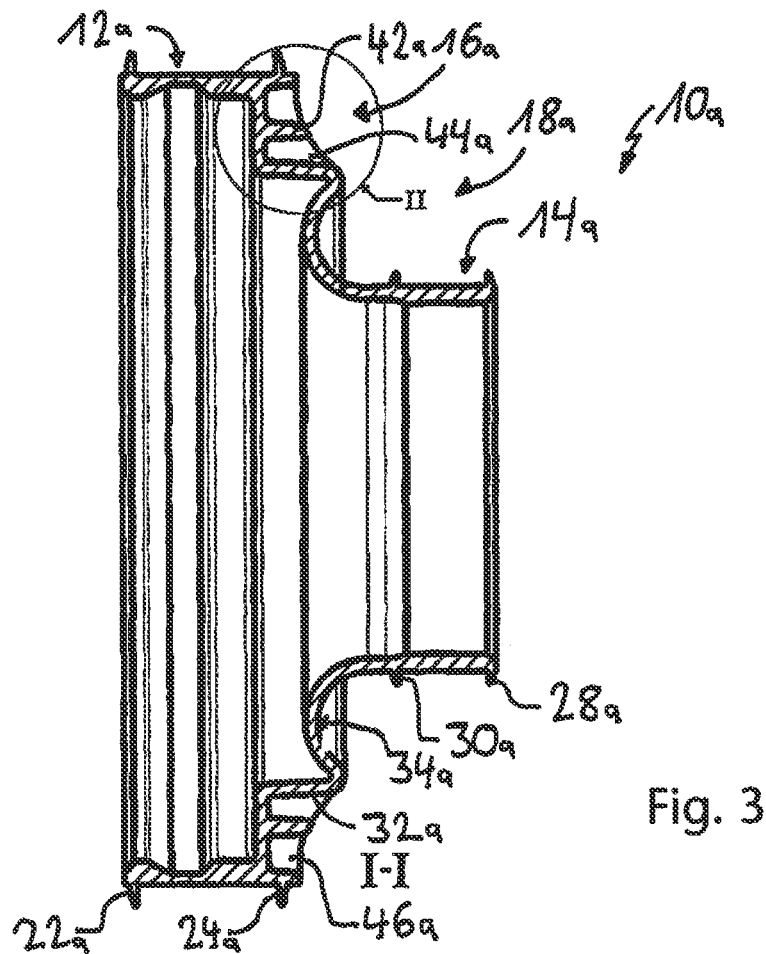
FIG. 3 shows a cross section along I-I in FIG. 2, through the rotating boot according to FIG. 1.

FIG. 3 shows a cross section along the line I-I in FIG. 2 through the rotating boot 10a. The design of the membrane region 18a with a first membrane part 32a and a second, trough-like membrane part 34a can be readily seen, as well as the transition of the membrane region 18a to the second fastening region 14a. Moreover, it can also be seen how the reinforcement fin 42a is formed with the supporting fins 44a and the radial fins 46a, forming a common outer edge 48a (see FIG. 4).

Figure 4:
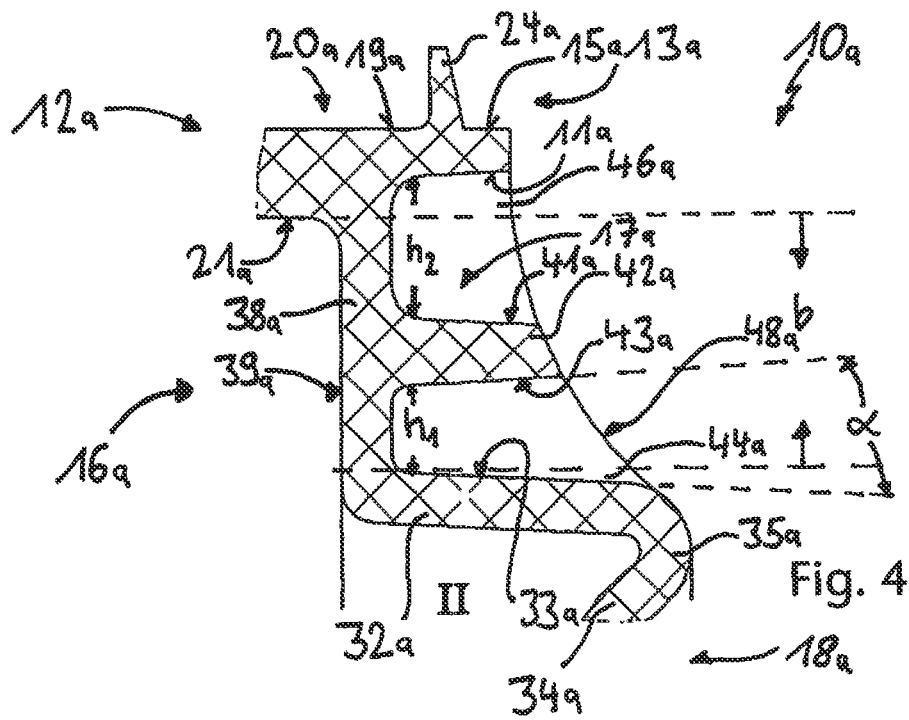
FIG. 4 shows the detail II in FIG. 3.

FIG. 4 shows an enlargement of a detail II of FIG. 3. The transition region 16a is formed by a wall portion 38a with an inner surface 39a, which can be used as a joint housing outer component, not shown herein, for the slip joint 6a. The transition region 16a is also formed by the one reinforcement fin 42a. The reinforcement fin 42 on the wall portion 38 of the transition region 16 is substantially perpendicular to the inner surface 39 of the wall portion 38. The wall portion 38a has a width b, determined by a lower surface 21a of the first binding seat region 20a of the first fastening region 12a and the transition to the first membrane part 32a of the membrane region 18a. The transition region 16a transitions directly into the membrane region 18a, in that the first membrane part 32a preferably adjoins the wall portion 38a directly. An upper surface 41a and a lower surface 43a of the reinforcement fin 42a are angled slightly toward one another.

The membrane part 18a between the first membrane part 32a and the second membrane part 34a, which can only be seen in part, shows the design of a rounded part 35a, which can also be seen in FIG. 2.

An angle α of 5° is formed between the lower surface 43a of the reinforcement fin 42a and an upper surface 33a of the first membrane part 32a. The shape of the supporting fin 44a can also be readily seen. This forms a common outer edge 48a without steps, with the first membrane part 32a, or the rounded part 35a, and an outer surface of the reinforcement fin 42a. The radial fin 46a is located between the upper surface 41a of the reinforcement fin 42a and a lower surface 11a of the excess material 13a of the first fastening region 12a. This also has an outer edge 48a aligned with that of the reinforcement fin 42a, such that a continuous outer edge 48a, i.e. without steps, is obtained in the form of an arc segment.

A height $h_1$ between the upper surface 33a and the first membrane section 32a and the lower surface 43a of the reinforcement fin 42a is lower than a height $h_2$ between the upper surface 41a of the reinforcement fin 42a and the lower surface 11a of the excess material 13a. The ratio of the heights $h_1:h_2$ is approximately 0.75. The reinforcement fin 42a is closer to the first membrane part 32a of the membrane region 18a, such that a height of the supporting fin 44a corresponding to the first height $h_1$ is lower than if the reinforcement fin 42a were displaced toward the first fastening region 12a. As a result, the weight can be reduced, and the reinforcement fin 42a is subjected to lower tangential forces than if it were displaced toward the first fastening region 12a.

The tendency of the rotating boot 10a to bend in the region of a joint housing outer edge, not shown herein, at high rotational rates is counteracted by the design of the radial fin 46a such that it extends fully under the lower surface 11a of the excess material 13a, and the design of the excess material 13a such that a smaller section of the first binding seat region 20a of the first fastening region 12a lies, with a second positioning element 24a, in the region of the excess material 13a, and thus above the radial fin 46a. The excess material 13a has an upper surface 15a, which is flush with an upper surface 19a of the first binding seat region 20a.

Figure 5:
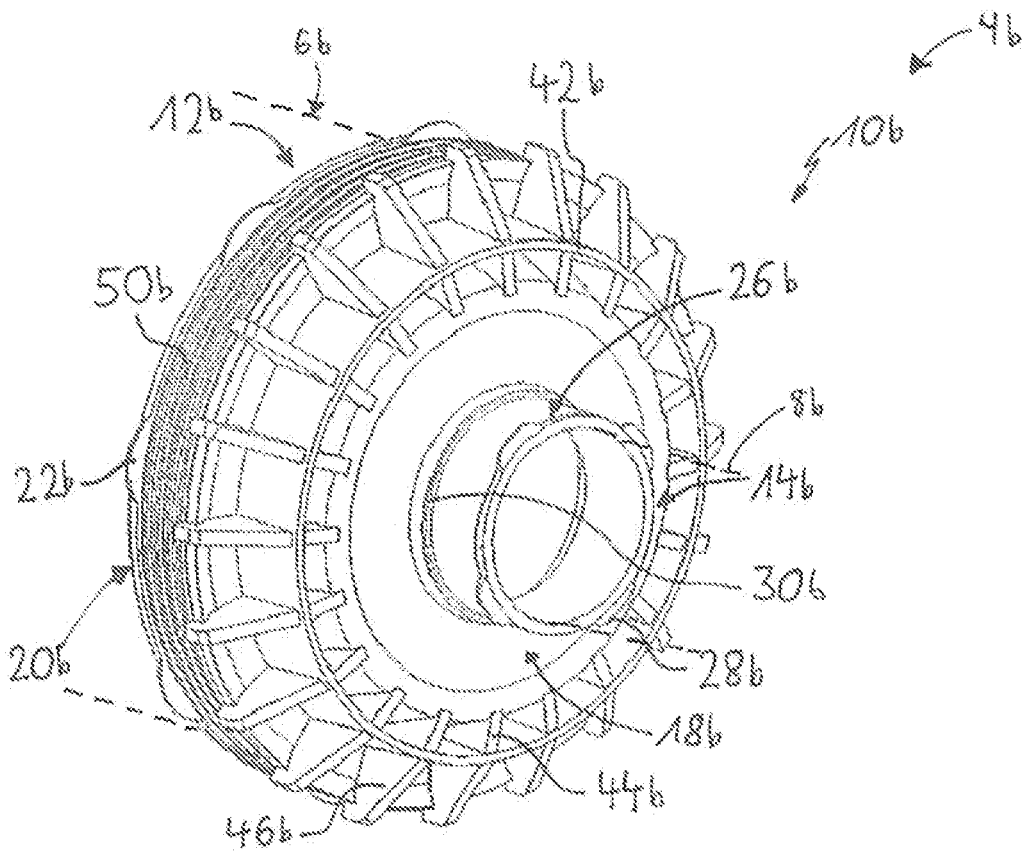
FIG. 5 shows a perspective view of a rotating boot in a second example, with a different type of radial fins.

FIG. 5 shows a second example of a rotating boot, indicated as a whole with the reference numeral 10b. In this case, in comparison with the first example according to FIGS. 1 to 4, the first fastening region 12b, the second fastening region 14b, as well as the reinforcement fins 46b in particular, have a different design. As such, the first fastening region 12b has numerous circumferential fins 50b in the first binding seat region 20b. The first binding seat region 20b is defined by ear-shaped first positioning elements 22b, but two positioning elements 24b are missing that are present in the first example according to FIGS. 1 to 4. Instead, a positioning or bearing function is provided by the radial fins 46b, which are different than those in the first example, and extend over an upper surface of the first binding seat region 20b. Furthermore, the second fastening region 14b differs from that in the first example according to FIGS. 1 to 4 in that, although third positioning elements 28b therein are also ear-shaped and evenly distributed in an edge section of the second fastening region 14b, located opposite one another in pairs, fourth positioning elements 30b have a different design, specifically, forming a circumferential positioning surface, which is provided directly adjacent to the membrane region 18b by a material reinforcement in this region.

Figure 6:
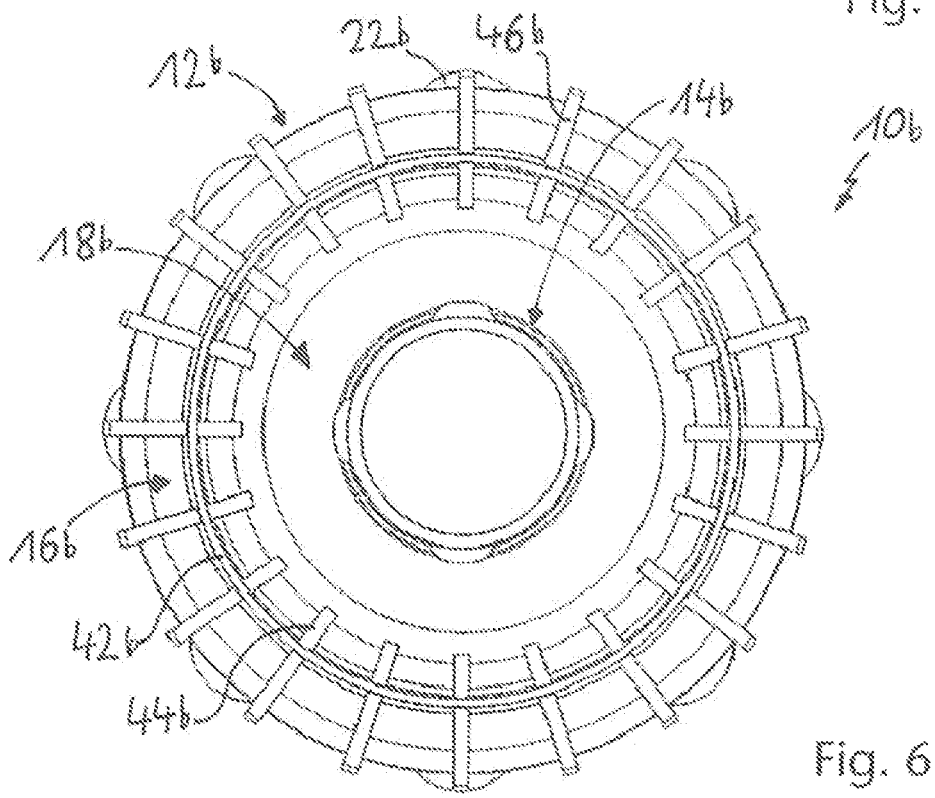
FIG. 6 shows a top view of the rotating boot according to FIG. 5.

FIG. 6 illustrates the design of the second example of the rotating boot 10b according to FIG. 5 in a top view. The excess material of the radial fins 46b extending over an upper surface of the first binding seat region 20b can be readily seen therein.

Figure 7:
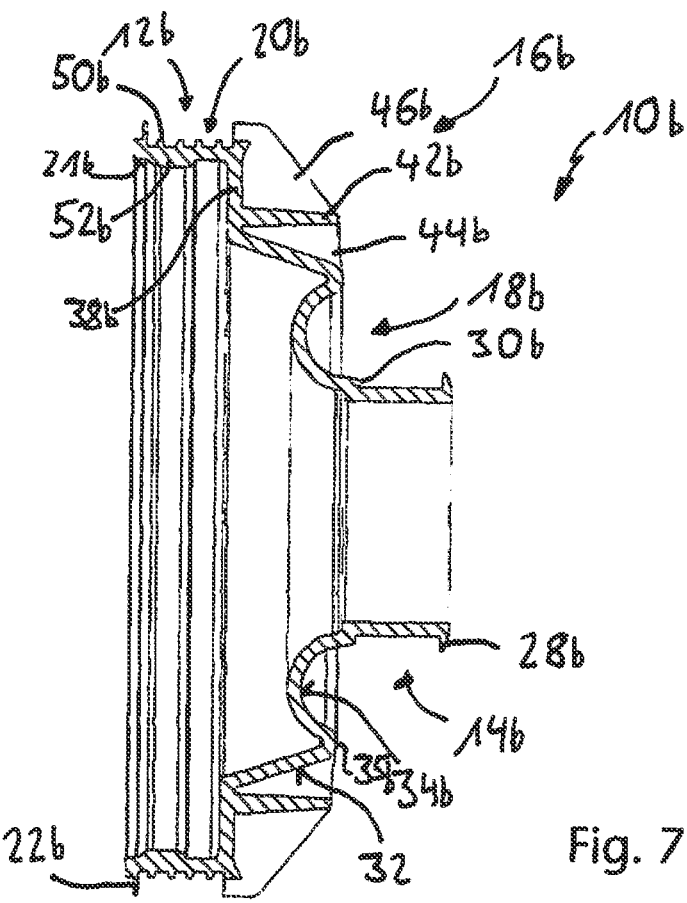
FIG. 7 shows a cross section through a rotating boot according to FIG. 5, similar to FIG. 3 above.

FIG. 7 shows a cross section through the second example of the rotating boot 10b, wherein the reinforcement fins 44b and radial fins 46b are not cut, and only the reinforcement fin 42b is cut, which is also, as with the first example according to FIGS. 1 to 4, located on a wall portion 38b of the transition region 16b. The reinforcement fin 42b, however, is longer in the second example than in the first example according to FIGS. 1 to 4, due to the different design of the radial fins 46b.

The first fastening region 12b with its first binding seat region 20b and a total of four circumferential fins 50b can be seen, and a material accumulation 52b can be seen on a lower surface 21b of the first fastening region 12b, or the first binding seat region 20b, which can be placed in a circumferential groove, not shown here, formed accordingly in a joint housing outer part. The second fastening region 14b with the ear-shaped third positioning elements 28b and the wall-shaped bearing or positioning surface 30b forming the fourth positioning element, can also be readily seen in FIG. 7. The membrane region 18b is similar to the membrane region 18a in the first example according to FIGS. 1 to 4, but the first material portion 32b is bent further away in relation to the wall portion 38b of the transition region 16b than in the first example. A rounded section 35b is formed adjacent to the first material portion 32b in the membrane region 18b, which transitions into a second material portion 34b, which is similar to that in the first example according to FIGS. 1 to 4.

Figure 8:
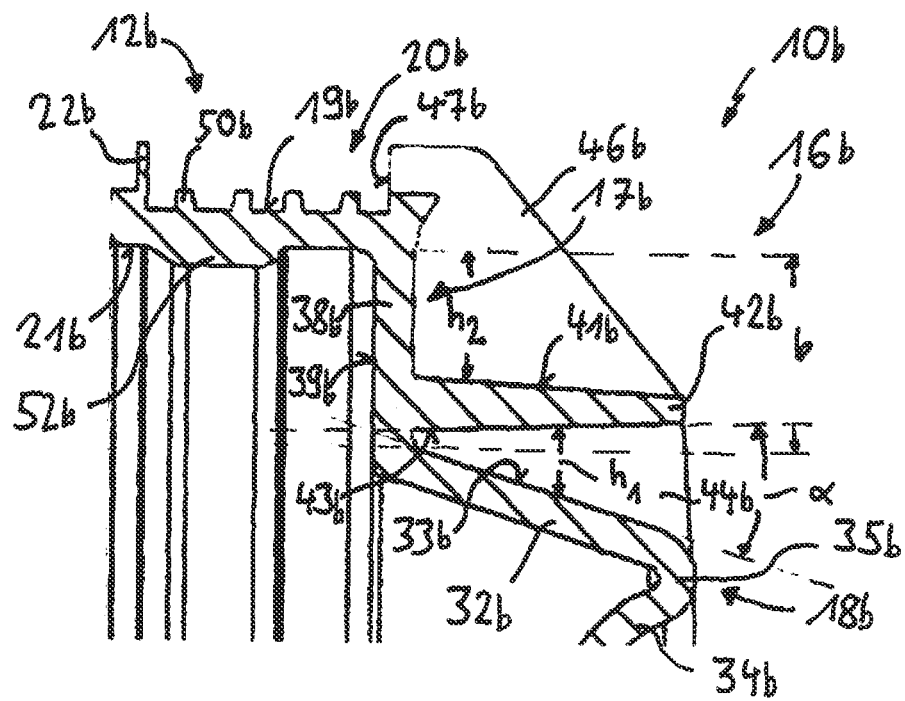
FIG. 8 shows a detail of the first fastening region and the transition region of the rotating boot according to FIG. 5, similar to FIG. 4.

In FIG. 8, the design of the numerous radial fins 46b with their bearing or positioning surface 47b can be seen, which, together with the first positioning elements 22b, define the first binding seat region 20b, upper surface 19b of which is located in the first fastening region 12b. The four circumferential fins 50b are located on the upper surface 19b of the first binding seat region 20b. A height $h_2$ between a surface of the circumferential reinforcement fin 42b and a line defined by the lower surface 21b of the first fastening region 12b, or the first binding seat region 20b is approximately 6 times as high as a height $h_1$, determined between a lower surface 43b of the circumferential reinforcement fin 42b and a surface 33b of the first material portion 32b of the membrane region 18b. The heights $h_1$ and $h_2$ are indicated at a distance to an outer surface 17b of the transition region 16b for illustrative purposes, as is also the case in FIG. 4. The heights $h_1$ and $h_2$ are determined, however, directly on the outer surface 17b of the transition region 16b lying opposite the inner surface 39 of the wall portion 38. An angle α of approximately 20° is formed between the lower surface 43b of the circumferential reinforcement fin 42b and the upper surface 33b of the first material portion 32b of the membrane region 38b. The reason for this is the greater bending in the first material portion 32b of the membrane region 18b in comparison with the first example according to FIGS. 1 to 4. A width b defines the width or height of the wall portion 38b of the first transition region 16b as being between a line defined by the lower surface 21b of the first binding seat region 20b, or the first fastening region 12b, and a parallel line through the transition point to the first material portion 32b of the membrane region 18b.

A rotating boot is disclosed that exhibits an improved radial stability, in particular at high rotational rates, such that it can counteract the lubricant pressure resulting from the high centrifugal forces, and also helps to dissipate the centrifugal forces acting on the boot material itself. Ultimately, the rotating boot exhibits an increased service life in comparison with rotating boots known from the prior art, at least at higher rotational rates.

The invention claimed is:

1. An apparatus, comprising:
   a rotating boot that includes a first fastening region, a second fastening region, a transition region adjacent to the first fastening region, and an adjoining membrane region comprising a first membrane part and a second membrane part which are connected to each other via a rounded part;
   wherein at least one circumferential reinforcement fin is located on the outer surface of the transition region;
   wherein a plurality of supporting fins are located between the reinforcement fin and the first membrane part;
   wherein the transition region comprises the reinforcement fin and a wall portion on which the reinforcement fin is arranged; and
   wherein the wall portion directly adjoins the first membrane part.

2. The apparatus of claim 1, wherein the reinforcement fin is substantially perpendicular to an inner surface of the wall portion.

3. The apparatus of claim 1, wherein the reinforcement fin is closer to the first membrane part than to the first fastening region.

4. The apparatus of claim 1, wherein an angle α in a range of approximately 0° to approximately 25° is formed between a lower surface of the reinforcement fin and an upper surface of the first membrane part.

5. The apparatus of claim 1, wherein the supporting fins and the at least one reinforcement fin are substantially perpendicular to one another.

6. The apparatus of claim 1, wherein a plurality of radial fins are located above the reinforcement fin.

7. The apparatus of claim 6, wherein the supporting fins and the radial fins are substantially flush with one another.

8. The apparatus of claim 6, wherein more supporting fins than radial fins are provided.

9. The apparatus of claim 1, further comprising a slip joint that includes the rotating boot.

10. The apparatus of claim 1, further comprising a shaft that includes the rotating boot.

11. The apparatus of claim 1, further comprising the rotating boot, at least one slip joint, and one shaft.

12. The apparatus of claim 1, wherein the reinforcement fin extends axially from the wall portion.

13. The apparatus of claim 1, wherein the respective supporting fins extend from the reinforcement fin to the first membrane part.

* * * * *

UNITED STATES PATENT AND TRADEMARK OFFICE
CERTIFICATE OF CORRECTION

PATENT NO. : 11,248,661 B2
APPLICATION NO. : 16/481559
DATED : February 15, 2022
INVENTOR(S) : Markus Deisinger et al.

It is certified that error appears in the above-identified patent and that said Letters Patent is hereby corrected as shown below:

On the Title Page

In the Abstract:
Column 2, Item (57), in Line 5, replace "and at least on" with --and at least one--.

Signed and Sealed this
Twenty-eighth Day of March, 2023

Katherine Kelly Vidal
*Director of the United States Patent and Trademark Office*